(No Model.)

J. S. SMITH.
DUST COLLECTOR.

No. 390,524. Patented Oct. 2, 1888.

Attest
Jesse M. Smith
P. L. Dorland

John S. Smith
Inventor
by
R. Mason
Atty

UNITED STATES PATENT OFFICE.

JOHN S. SMITH, OF JACKSON, MICHIGAN.

DUST-COLLECTOR.

SPECIFICATION forming part of Letters Patent No. 390,524, dated October 2, 1888.

Application filed April 7, 1888. Serial No. 269,999. (No model.)

*To all whom it may concern:*

Be it known that I, JOHN S. SMITH, of Jackson, in the county of Jackson and State of Michigan, have invented a new and useful Improvement in Dust-Collectors, of which the following is a specification.

My improvement belongs to that class of dust-collectors in which a current of dust laden air is admitted through a spout arranged tangentially into a circular chamber, on the interior surface of which the dust is deposited by centrifugal action, and sliding down a conical hopper is discharged through an opening at the bottom, while the air freed from the dust escapes upwardly through an opening in the top, to which it is conducted by a cylindrical inwardly-descending tube. In such dust-collectors the air has while in the interior a vortical movement sweeping around the surface until it comes to the inlet, where, having lost part of its force and deposited part of its dust, it encounters the entering current, by which it is deflected and forced toward the center, where it escapes through the central opening, carrying with it some of the dust.

My invention is intended to produce a more perfect separation of the dust from the air by means of a deflecting-plate extending from near the periphery of the chamber curving inwardly to the edge of the incoming current, the construction and operation of which will appear from the following description.

Figure 1:
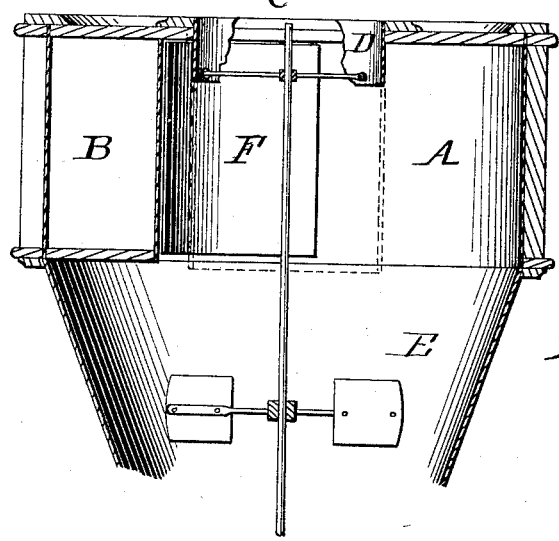
Figure 2:
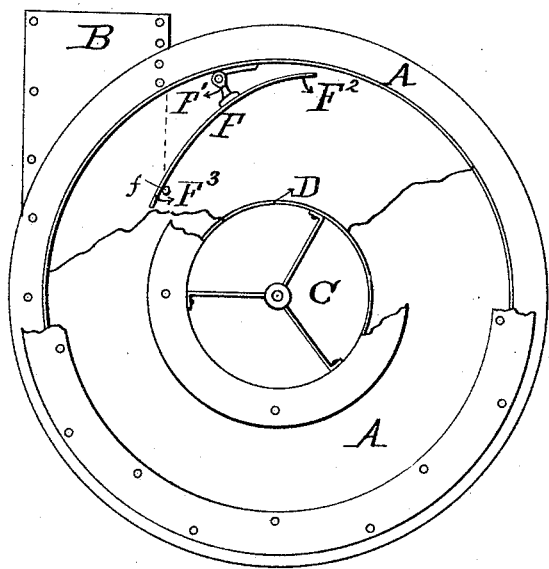

In the annexed drawings, making part of this specification, Figure 1 is a central vertical section of the upper part of the dust-collector. Fig. 2 is a plan view, partly in horizontal section.

The same letters are employed in both figures in the indication of identical parts.

A is the upper, and preferably cylindrical, portion of the dust-collecting chamber.

B is the air-induction pipe, through which the air enters tangentially to sweep around the chamber and deposit its dust by centrifugal action against the wall of the chamber.

C is the air-escape opening, having below it the tubular guard.

Below the chamber or portion of the chamber A is a conical hopper, usually in the form of an inverted truncated cone, through an opening in the lower end of which the dust which falls down the sides of the chamber is allowed to escape. Only part of this hopper is shown, its form being well known. There is also shown a centrally-placed shaft carrying fan-blades, used in some machines, but which, as it forms no part of this invention, need not be described herein.

All the parts hereinbefore indicated by letters and described are common in dust-collectors of this class. Regarding the drawings, and still referring to the ordinary machines, it will be readily perceived that the air entering with force at B will be deflected by the wall of A and caused to sweep around its surface until it comes to the induction-current, which crosses its path, and it will be deflected thereby and forced toward the center, whence it will escape at C. The tubular guard is introduced for the purpose of hindering its too free escape, causing it to descend generally to the level of the bottom of the entering air-current and forming an eddy to facilitate the deposition of some of its solid particles still carried in suspension. It will be observed that the guard or flange D in the drawings is much shorter than in other machines of this class, and is needed for little else than to carry the spider which supports the vertical shaft; otherwise it may be entirely dispensed with.

F is a deflecting-plate, of the width of the vertical depth of the air-induction spout B, and formed substantially as shown in Fig. 2. It is hung by the lugs F' to the wall of the chamber in such position that its forward end, $F^3$, shall project slightly beyond the inner line of spout B, as is indicated by the dotted line in extension thereof in Fig. 2 of the drawings, and its other end, $F^2$, shall be near to but not in contact with the shell or wall. It is attached by hinge-joints to the wall, and the lugs are placed nearer the inner end, $F^2$—say at one-third of the distance from $F^2$ to $F^3$—so that the plate shall be held in position between the entering tangential and the vortical parts of the current. A stop properly placed will define the minimum width of the opening between the plate and the shell or wall of the chamber, which stop is indicated on Fig. 2 at *f*, and must be so located as not to permit the entire closing of the passage adjacent to the shell or wall.

The air entering the pipe B, laden with fine particles of solid matter, when diverted by the wall into a circular movement, will deliver the dust against the wall, where much of it will adhere and fall down into the hopper E; but still some of these particles, while the centrifugal action will bring them in close proximity to the wall, will be carried forward by the current of air and pass through the opening behind the plate and toward the entering current of air. As that space which is formed between the plate and the wall increases rapidly in width, the velocity of that portion of the vortical current will correspondingly diminish, permitting part of the solid particles to fall by gravity into the hopper, while the others will be drawn by the entering current and mingled with it and again be carried with the vortical current. The other portion of this current, being comparatively free from dust, will be diverted by the plate toward the center and thence escape through C. By this means I confine the dust particles to the exterior portion of the current, and continue them under the influence of the centrifugal force until they are delivered from the current and fall to the bottom.

What I claim as my invention, and desire to secure by Letters Patent, is—

1. In combination with the shell of chamber A, a deflecting-plate arranged with one end near to but not in contact with the shell, and the other end farther from the shell, substantially as set forth, whereby it is adapted to divide the vortical current and to return a portion thereof to the air-induction current.

2. The herein-described dust-collector, consisting of a conical chamber, a tangential inlet-spout communicating therewith, an air-outlet at the top, a dust-outlet at the lower end, and a deflector located within the chamber extending partially across the inlet-opening, and having its rear end near to but not in contact with the wall of the chamber and its forward end farther from the same.

3. In combination with the shell or wall of the dust-collecting chamber, air induction and eduction openings, a swinging deflecting-plate pivoted between its ends, substantially as set forth.

4. In combination with a dust-collecting chamber, air induction and eduction openings, a deflecting-plate, F, the point $F^2$ of which is arranged in proximity to the wall of the chamber for dividing the vortical current, substantially as set forth.

In testimony whereof I have hereunto set my hand in the presence of two subscribing witnesses.

JOHN S. SMITH.

In presence of—
   CHAS. E. SNOW,
   G. A. RAYMOND.